(No Model.)  3 Sheets—Sheet 1.

H. H. DILLE & E. W. McGUIRE.
MACHINE FOR MEASURING AND CUTTING FABRICS.

No. 376,641.  Patented Jan. 17, 1888.

Witnesses:
Jas. E. Hutchinson.
Henry C. Hazard.

Inventor
H. H. Dille and E. W. McGuire
by Prindle and Russell
their Attorneys

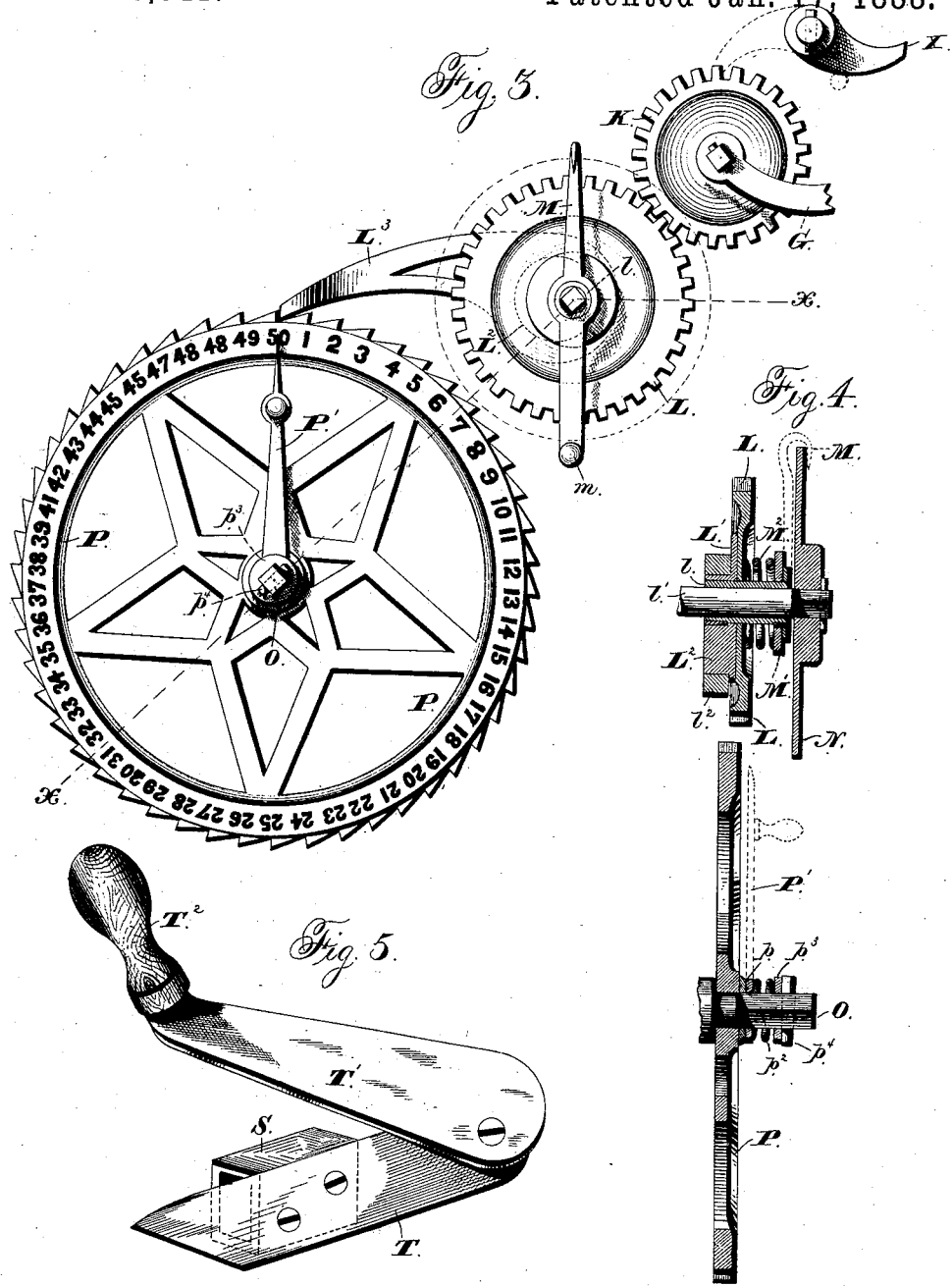

(No Model.) 3 Sheets—Sheet 3.
H. H. DILLE & E. W. McGUIRE.
MACHINE FOR MEASURING AND CUTTING FABRICS.
No. 376,641. Patented Jan. 17, 1888.
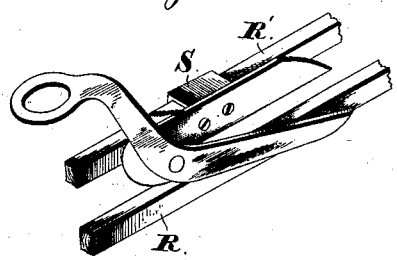
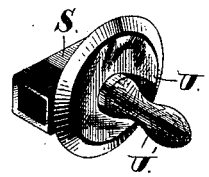
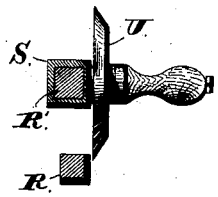
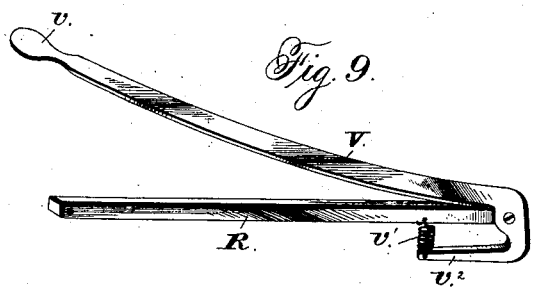
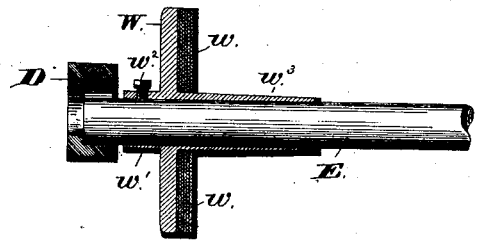
Witnesses:
Jas. E. Hutchinson.
Henry C. Hazard.
Inventor:
H. H. Dille and E. W. McGuire
by Prindle and Russell
their Attorneys
N. PETERS, Photo-Lithographer, Washington, D. C.

UNITED STATES PATENT OFFICE.

HENRY H. DILLE AND ELWOOD W. McGUIRE, OF RICHMOND, INDIANA, ASSIGNORS TO THE DILLE & McGUIRE MANUFACTURING COMPANY, OF SAME PLACE.

MACHINE FOR MEASURING AND CUTTING FABRICS.

SPECIFICATION forming part of Letters Patent No. 376,641, dated January 17, 1888.

Application filed April 3, 1886. Serial No. 197,745. (No model.)

*To all whom it may concern:*

Be it known that we, HENRY H. DILLE and ELWOOD W. McGUIRE, of Richmond, in the county of Wayne, and in the State of Indiana, have invented certain new and useful Improvements in Apparatus for Measuring and Cutting Fabrics; and we do hereby declare that the following is a full, clear, and exact description thereof, reference being had to the accompanying drawings, in which—

Figure 1:
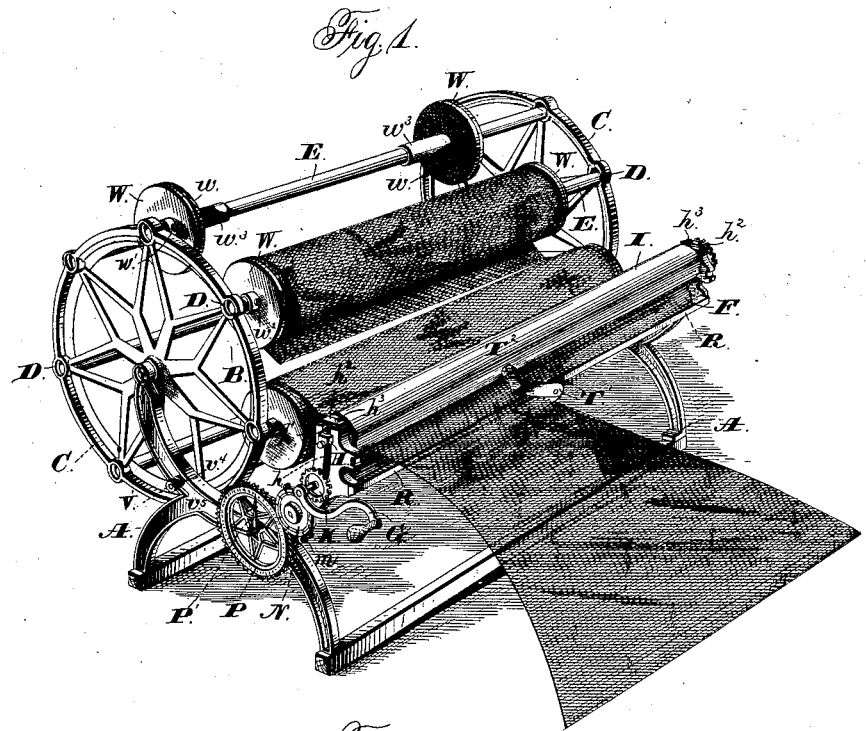
Figure 2:
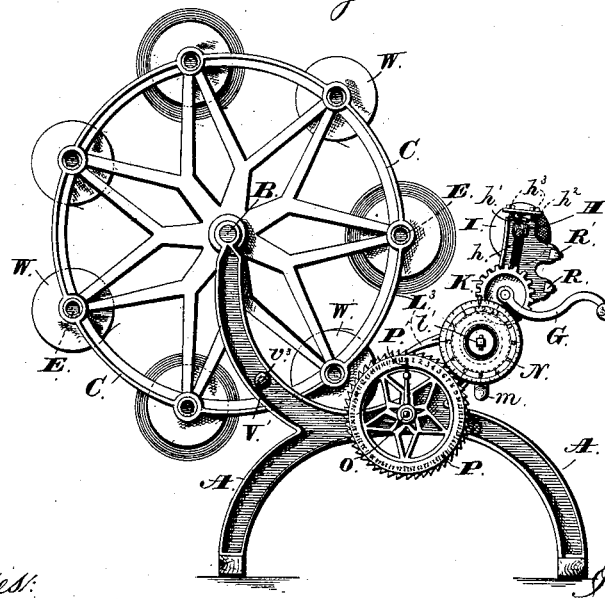

Figure 1 shows a perspective view of our machine; Fig. 2, a view of the same in end elevation; Fig. 3, a detail view showing the measuring devices enlarged; Fig. 4, a detail sectional view of the measuring devices on line *x x* of Fig. 3; Fig. 5, a detail perspective view of the cutting device; Fig. 6, a similar view of a modified form of such device; Fig. 7, a similar view of another form of cutter; Fig. 8, a detail view, in elevation, of the same; Fig. 9, a detail perspective of another form of cutting device, and Fig. 10 a detail sectional view of the means for holding a roll of goods and preventing it from unwinding.

Letters of like name and kind refer to like parts in each of the figures.

The object of our invention is to provide a machine or apparatus for holding, measuring, and cutting wire-cloth, architect-paper, window-shades, and fabrics of various kinds; and to this end our invention consists in the apparatus or machine and its various parts constructed, arranged, and combined as hereinafter specified.

In the drawings, A designates the supporting frame or standard for the various parts of the machine. We prefer to make such frame of the form shown in the drawings, but do not limit ourselves to such form or construction. In bearings at opposite ends of this frame are journaled the opposite ends of shaft B, upon which, close to the bearings, are fixed the two heads C C, provided with the corresponding and opposite sockets D D, for receiving and supporting the ends of the series of rollers or rods E E, for carrying rolls of wire-cloth or other fabric. It is our intention to have the number of sockets, and consequently the number of the roll or bolt carrying rollers, large enough to accommodate a series of rolls of all the desirable sizes or dimensions.

In the drawings we show the machine adapted to carry seven rolls of goods at one time.

The heads C C we prefer to make in open-work or skeleton form, as shown.

Each of the sockets D D has an opening in its outer side just large enough to allow the passage of the roller or rod E, and on its inner side is made larger or of greater diameter than such opening. With this construction, when the rod or roller has been placed with its ends resting in the opposite sockets on the heads, it cannot get loose or work out of the socket at either end on account of the engagement of the bottoms or outer sides of the sockets with its ends. However the heads are rotated and in whatever consequent position the rod may be brought, its lower side, resting on the lower portions of its sockets, will be below the central openings in the outer sides of the sockets, and consequently neither of its ends can work out through the opening in the socket in which it rests. The rods or rollers can obviously with this construction be easily and readily removed or inserted in place, either with or without rolls of goods or fabric on them.

To insert a rod in place, one end is passed out a short distance through the opening in the bottom or outer side of a socket in one of the heads, and the other end is raised so as to enter the corresponding socket on the other head. Endwise movement of the rod to bring this end into the socket will then cause the other end to drop into place in the other socket.

On the front side of the machine is the roller F, parallel to the pivot-shaft of the heads C C, and having its opposite ends journaled in suitable bearings on the frame, as shown. The pivot-shaft of this roller is extended at its opposite ends beyond the bearings, and at one end is provided with the crank G, by which the roller can be turned.

On the frame above the journal-bearings for roller F are the vertically-movable journal-bearings H H for the roller I. Each of these movable bearings is guided in a slot, *h*, in the frame, and on its upper side is engaged by a spring, *h'*, whose stress can be adjusted by means of the plate $h^2$ and screws $h^3$ $h^3$, passing through the plate into the frame on opposite sides of slot $h$.

On the pivot-shaft of roller F, at the end opposite to that on which is the crank G, is a small gear-wheel meshing with a similar wheel on the shaft of roller I, so that the two rollers are compelled to rotate together and equally.

On the pivot-shaft of roller F, between the crank and its bearing, is the gear-wheel K, meshing with the gear-wheel L, journaled on the sleeve $l$ on the stud $l'$ on the frame. On the inner side of this wheel the sleeve is provided with a broad collar or flange, L', bearing against the inner face of the wheel. Fixed on the sleeve just beyond such flange or collar is the eccentric $L^2$, engaged or surrounded by the eccentric-strap portion $l^2$ of pawl $L^3$. The collar or flange and the eccentric are preferably made in one piece, as shown; but this, of course, is not necessary.

Upon the outer end of the sleeve $l$ is fixed the index-hand or pointer M, having at one end a knob or handle, $m$, by which it can be turned and set, and at the other end extending outward and over the graduated edge of the dial N, fixed on the squared outer end of the stud $l$, as shown. The scale around this dial is divided into twelve equal parts, numbered from one to twelve, inclusive, and each of the divisions is divided, preferably, into quarters.

On the sleeve $l$, engaging the inner side of index-hand M, is the washer M', and around the sleeve, between such washer and the gear-wheel L, is the spring $M^2$, bearing against the wheel so as to press it against the collar L', so that normally the wheel and collar will be caused to move together because of the friction between them. With this construction, as the wheel L is caused to revolve by the rotation of the gear-wheel meshing therewith, the sleeve $l$ will also be caused to revolve to carry the index end of hand M, to travel around over the graduations on the dial.

The two meshing wheels K and L are of such size with relation to each other and the roller F that the latter wheel makes one complete revolution to carry the hand M around the dial for every foot that the periphery of the roller travels as the roller rotates. As then the dial is, as described, divided up into twelve equal subdivided divisions, the pointer will always indicate on such dial the number of inches and fractions thereof which the periphery of the roller F has traveled. As the sleeve upon which the hand M is fixed is frictionally connected, as described, with the wheel L, the hand will, as indicated, normally rotate with the wheel, but can be set back or forward independently of the wheel, as desired, by means of handle $m$. This construction enables the hands to be set back to the starting-point on the dial again at any time without rotating the wheel. As the eccentric, being fixed on the sleeve, must turn with the sleeve and hand, it, too, is always set with the hand to a certain position with relation to the starting-point of the graduations on the dial.

Journaled on stud O is the wheel P, having around its edge a series of number-graduations, preferably from one to fifty, inclusive. The edge of the wheel is formed with ratchet-teeth corresponding in number with the graduations and engaged by the end of pawl $L^3$. At each complete revolution of the wheel L the pawl is moved outward by the eccentric $L^2$, turning with the wheel, so as to engage one of the ratchet-teeth on wheel P and move the latter through the distance of one of its numbered graduations. The number of complete rotations of wheel L will then be indicated by the number of the graduations on wheel P, which are carried by a certain point. The pointer or index-hand P', pivoted on stud O outside of the wheel P and separated from the latter by the collar $p$ on the stud, is frictionally held stationary as the wheel revolves by means of the friction-spring $p^2$ pressing it against the collar $p$. A washer, $p^3$, held on the stud by means of pin $p^4$, serves to hold the spring pressing against the hand. Such hand, remaining stationary as the wheel rotates, acts in conjunction with the graduation-numbers on the wheel to indicate how many of such graduations are carried by the rotation of the wheel past a given point. With this construction, as shown, as the wheel L rotates once for every foot that the periphery of roller F travels, and the wheel P is rotated through one graduation at each complete rotation of wheel L, the number of graduations on wheel P, passing under pointer P', will indicate how many feet the periphery of the roller F has traveled.

Attached to the front of the machine-frame in front of and parallel with the roller F is the bar R, having its upper side on, or nearly on, a level with the upper side of the roller. On this bar, which is preferably angular in cross-section, fits and slides the sleeve S, to which is rigidly attached, by screws or otherwise, the stationary cutting-blade T. To such blade, at or near one end thereof, is pivoted the cutting-blade T', adapted to shear past the edge of the stationary blade, and provided with a handle, $T^2$, by which it can be operated. The forward end of the blade T—that is, the end opposite to that to which blade T' is pivoted—is preferably rounded or inclined downward on its under side, so as to ride under any fabric extending forward over the roller F and guide it up over the blade as the sleeve S is slid along the bar R. With this construction, if some of the material carried by the rotary carrier already described be fed out over roller F and bar R, the sleeve and cutters being at the outer side of the machine, the material can be cut most accurately on a line parallel with the bar and roller by grasping the handle of blade T' and vibrating it up and down and at the same time drawing it along the bar across the machine.

I contemplate using several other forms of cutters moving across the machine instead of that just described. As shown in Fig. 6, a second bar, R', parallel with but above bar R, can be attached to the frame, and the sleeve carrying the fixed blade can be placed thereon. With such construction the vibrating blade cuts below the bar R', and is preferably provided with a handle like an ordinary shear-handle. Such a cutter can be arranged, as shown, to cut from the left of the machine to the right, and can be pushed along as it is operated, instead of being pulled, as in the other form. The bar R can be left on or removed, as desired, when this modified form of cutter is used.

In Figs. 7 and 8 I show a rotary cutting-wheel, U, pivoted or journaled to the sleeve S on the bar R and shearing close along the edge of bar R. Such sleeve is provided with a handle, U', by which it can be drawn along across the machine to cause the wheel to cut the fabric.

In Fig. 9 I show another form of cutting device, in which a long curved knife, V, with handle $v$, is used, pivoted to the bar R at its outer or right-hand end, and shearing close along the bar as it is thrown down. A spring, $v'$, attached to the bar R and to a short rigid arm, $v^2$, of the knife, draws such arm upward and tends to hold the knife normally elevated, as shown in the drawings. The connected heads C C, with the rods or rollers carried thereby, form a reel, which can be rotated as desired to bring any one of such rods or rollers, with the roll of material or fabric which it carries, down close to and parallel with the roller F. To lock such reel from turning, we provide a spring-stop, V', on the frame, which is adapted to engage a portion of one of the heads.

We do not limit ourselves to any particular form of such stop, but prefer the one shown in the drawings, consisting of the pin $v^3$, projecting through the frame into the track of the spokes or arms of the reel head, and having a collar, $v^4$, in a recess, $v^5$, in the frame engaged and normally pressed inward by a spring. (Not shown.) To hold the rolls of fabric or material on the rods or rollers of the reel from coming accidentally unwound, we provide each of such rods with two plates or disks, W W, adapted to be moved up against the ends of a roll of material, and provided on their inner faces with yielding material $w$,—as felt—adapted to engage the edges of the material at the ends of the roll. Each of these plates has a short hub, $w'$, on its outer side, surrounding the rod, through which is tapped a set-screw, $w^2$, engaging the rod, so as to fix the plate as adjusted thereon, and a longer hub, $w^3$, on its inner side, adapted to project within the roll, as shown. The layers $w$ $w$, of felt or other yielding material, on these plates will engage the edges of the material at the ends of the roll sufficiently to prevent their coming unwound, while allowing the material to be pulled or unwound from the roll as wanted.

The operation of my machine is briefly as follows: Bolts or rolls of material of the various dimensions or kinds having been placed on the reel rods or rollers E E, and such rods having been inserted at their ends in the sockets in the reel-heads when any particular kind or dimension of material is desired, the roll of such material is brought down to the roller F and the reel is locked by the stop described. The edge of the material is then inserted between rollers F and I and drawn forward by rotating roller F by crank G, so as to bring its edge over bar R. The index-hands M and P' are then set over the beginnings of the scales of graduations on the dial N and the wheel P, respectively. The roller F, by means of the crank, is then rotated until the desired number of feet and inches are indicated on the wheel and dial, respectively, by pointers P' and M. This will indicate that the periphery of roller F has traveled that number of feet and inches, and consequently that that much of the fabric has been fed out over bar R. The material is then cut off along bar R by the moving cutting device described and shown. When another piece of goods is to be measured and cut off, the pointers are turned without moving the wheels and are set at the beginning of the scales on their respective wheels again. If a piece of a different roll of goods is desired, the end of the material between the rollers F and I is withdrawn and the reel is unlocked and rotated to bring the desired roll down into proper position with relation to the measuring-roller.

By our machine or apparatus, which can be adapted for the handling of seven or any desired number of rolls of goods of any dimensions, the bother and waste of time necessary in handling wire screen material, as such handling has heretofore been done, can be avoided. Because of the accuracy in measuring and cutting attainable by the use of our machine, much, if not all, the considerable waste in remnants hitherto occurring in handling goods in the roll can be prevented.

As indicated hereinbefore, our machine can be used for holding, measuring, and cutting a very large variety of goods, as wire-cloth, paper, window-shades, &c.

If desired, we contemplate having the rod-supporting sockets on one of the heads closed at their bottoms or outer sides, as it is obviously not necessary to enable the rods to be inserted in place that the sockets in both heads should have openings in their outer sides.

On the frame above and to the part of the gear-wheel K we pivot the pawl X, which can, when desired, be swung down to engage the teeth of the wheel, as indicated in dotted lines in the drawings, so as to prevent the forward rotation of the roller F. While our machine is being used for measuring, as hereinbefore set forth, this pawl is swung up out of engagement with the wheel teeth. When, however, as is often found desirable, the netting or other fabric taken from one of the rolls is to be stretched and fastened to a frame, this pawl is found to be most convenient. After the fabric has been run out over the frame placed in front of the machine and has been tacked, nailed, or otherwise fastened to the outer end of such frame, it can be stretched back smoothly over the latter by backward rotation of roller F by the crank G. The roller then having been locked by the action of pawl X, the fabric can be most easily and smoothly fastened on all sides and ends of the frame.

With regard to the pawl L³ for actuating the foot-wheel P, it will be observed that as the eccentric is always set to the same relative position with reference to the starting-point of the graduations on the dial N when the hand M is set to such point after each measuring operation, the pawl will always be moved outward at the same time with relation to the travel of the hand over the divisions of the dial. The eccentric is therefore so set on the sleeve with relation to the hand that its longest radius is on the side toward the wheel P when the hand M is set over the figure 12 on the dial, ready to begin its circuit.

Having thus described our invention, what we claim is—

1. A machine for measuring and cutting fabrics, having means for holding the fabric to be measured and cut, a rotary feeding and measuring roller, means for rotating the roller, and a cutting device mounted on and movable along a fixed guide on the delivery side of the feed-roller, substantially as and for the purpose specified.

2. A machine for measuring and cutting fabrics, having a suitable holder for the fabric, the feeding and measuring roller, the fixed guide-bar on the opposite side of the feed-roller frame, the fabric-holder, and the cutting device attached to a sleeve sliding on the bar, substantially as and for the purpose shown.

3. In combination with a suitable framework and a holder to receive a roll of goods to be cut and measured, the measuring-roller F, the roller above the same, means for rotating roller F to draw the goods from the roll, the fixed guide-bar on the delivery side of the roller F, and the cutting device made movable along the bar, substantially as and for the purpose described.

4. In combination with feed and measuring roller F and means for rotating it, the roller above the same journaled in movable bearings, springs for pressing such bearings toward those of roller F, gearing connecting the two rollers, the guide-bar on the delivery side of the roller, and the movable cutter guided by and moving along such bar, substantially as and for the purpose described.

5. In combination with the gear-wheel L of the registering mechanism, the eccentric connected with the wheel by means adapted to cause it to rotate with the wheel, but to allow it to be rotated independently of the wheel, the pawl provided with a portion engaging and actuated by such eccentric, and a toothed wheel engaged by the pawl, substantially as and for the purpose set forth.

6. In a registering mechanism, in combination with the gear-wheel L, the dial, the pointer, and the eccentric rigidly connected together and frictionally connected with the wheel, and the pawl actuated by the eccentric and adapted to actuate the next wheel in the train of registering mechanism, substantially as and for the purpose described.

7. In combination with the dial, the sleeve on the stud provided with a flange or collar and carrying an eccentric, the hand or pointer fixed on the sleeve, the wheel on the sleeve, and the spring pressing the wheel against the flange or collar, substantially as and for the purpose specified.

8. In combination with the gear-wheel L and the fixed dial, the pointer and eccentric rigidly connected together and yieldingly connected with the wheel, the pawl actuated by the eccentric, and the toothed register-wheel engaged by the pawl, substantially as and for the purpose specified.

9. In combination with a graduated rotary registering-wheel, the stud upon which such wheel is journaled, provided with a collar, the index-hand pivoted on the stud outside of the collar, and the friction spring on the stud pressing against the hand, substantially as and for the purpose described.

10. In combination with the gear-wheel rotating with roller F, the gear-wheel meshing therewith, the dial, the hand normally carried with wheel L and adapted to be set independently thereof, the graduated wheel, and means for actuating such wheel from wheel L, rigidly connected with the index-hand, so as to be set with such hand, substantially as and for the purpose specified.

11. In combination with a rotary head provided with a series of sockets, the rotary head connected therewith, provided with a corresponding series of opposite sockets having openings through their outer sides made smaller than the sockets themselves, and the rods having their ends of less diameter than the sockets, substantially as and for the purpose specified.

12. In combination with the two rotary heads C C, provided with corresponding sockets having openings in their bottoms or outer sides smaller than the sockets, the rods of such diameter at their ends as to be capable of passing through such openings, substantially as and for the purpose shown.

13. In combination with a bolt or roll carrying rod, the two plates thereon having yielding material on their inner faces, and means for fixing such plates at any desired adjustment on the rod, substantially as and for the purpose specified.

14. In combination with a roll or bolt carrying rod, a plate or disk thereon, provided with a surface of felt on its face adapted to engage one end of the roll, substantially as and for the purpose shown.

15. As a means for keeping a roll of fabric from unrolling, a plate or disk having a hub adapted to enter the roll and provided with a layer of felt or other yielding material on its face to engage the roll end, substantially as and for the purpose set forth.

16. In combination with means for holding the fabric or material, the geared rollers for feeding out the material and means for rotating them, the toothed wheel on the shaft of one of the rollers, and a pawl adapted to be brought into engagement with the teeth on such wheel, so as to allow it to be turned backward, but prevent its forward rotation, substantially as and for the purpose set forth.

17. In a measuring mechanism for fabrics, in combination with the feed-roller F and the toothed wheel for operating the measuring mechanism as the roller turns, rigidly connected with the roller, the pawl X, for engaging the wheel, so as to prevent its forward rotation, adapted to be thrown into or out of engagement with the wheel at will, and means for rotating the roller in either direction, as desired, substantially as and for the purpose described.

In testimony that we claim the foregoing we have hereunto set our hands this 6th day of March, 1886.

H. H. DILLE.
ELWOOD W. McGUIRE.

Witnesses:
JOSEPH DOAN,
I. C. DOAN.